(12) United States Patent
Vogel et al.

(10) Patent No.: US 8,342,915 B1
(45) Date of Patent: Jan. 1, 2013

(54) CONDITIONING AND CUTTING APPARATUS

(76) Inventors: David Vogel, Columbus, IN (US); David Wolff, Chesnee, SC (US)

(*) Notice: Subject to any disclaimer, the term of this patent is extended or adjusted under 35 U.S.C. 154(b) by 372 days.

(21) Appl. No.: 12/716,635

(22) Filed: Mar. 3, 2010

(51) Int. Cl.
*B24B 3/00* (2006.01)

(52) U.S. Cl. ..... 451/552; 451/555; 451/553; 269/289 R; 76/82

(58) Field of Classification Search ............. 451/552, 451/555, 45, 321; 76/82, 86
See application file for complete search history.

(56) References Cited

U.S. PATENT DOCUMENTS

| | | | |
|---|---|---|---|
| 97,090 A * | 11/1869 | Howland | 76/87 |
| 647,640 A * | 4/1900 | Withington | 451/552 |
| 786,141 A * | 3/1905 | Owens et al. | 451/552 |
| 1,257,927 A * | 2/1918 | Reagan | 451/367 |
| 1,500,241 A * | 7/1924 | Gum | 451/552 |
| D135,457 S | 4/1943 | Generale | |
| 2,495,814 A | 1/1950 | Marcantonio | |
| 2,520,279 A | 8/1950 | Gallo | |
| 2,707,852 A | 5/1955 | Fillweber | |
| 3,094,730 A | 6/1963 | Schwarz | |
| 3,758,993 A | 9/1973 | Kirtz | |
| 3,926,419 A * | 12/1975 | Kenny | 269/16 |
| 3,971,273 A | 7/1976 | Peters et al. | |
| 4,912,885 A * | 4/1990 | Bonapace | 451/552 |
| 5,040,256 A * | 8/1991 | Mills | 7/164 |
| 5,233,793 A | 8/1993 | Dandurand | |
| D348,591 S | 7/1994 | Willis | |
| 5,477,753 A * | 12/1995 | Branscum et al. | 76/82 |
| 5,582,535 A * | 12/1996 | Friel | 451/45 |
| 5,976,002 A * | 11/1999 | Keough | 451/556 |
| 6,059,645 A * | 5/2000 | LeVine | 451/557 |
| D458,812 S | 6/2002 | Wong | |
| 6,663,096 B2 * | 12/2003 | Heath et al. | 269/289 R |
| D492,166 S | 6/2004 | Kaposi | |
| 6,866,569 B2 | 3/2005 | Cozzini | |
| 7,172,500 B1 * | 2/2007 | Wu et al. | 451/319 |
| 7,287,445 B2 | 10/2007 | Friel, Sr. et al. | |
| 7,517,275 B2 | 4/2009 | Friel, Sr. et al. | |
| 2008/0166959 A1 * | 7/2008 | Williams | 451/552 |
| 2009/0166943 A1 * | 7/2009 | Raschkov | 269/290 |

* cited by examiner

*Primary Examiner* — George Nguyen

(74) *Attorney, Agent, or Firm* — Dority & Manning, P.A.

(57) ABSTRACT

A conditioning and cutting apparatus for a blade is provided. The apparatus may include a cutting board and a conditioning device. The cutting board may include a top cutting surface, a bottom surface disposed in opposition to the top cutting surface, and a peripheral wall extending between the top cutting surface and the bottom surface and defining the perimeter of the cutting board. The cutting board may define a channel therein. The channel may define a recess and an opening thereto. The peripheral wall may define the opening of the channel. The conditioning device may be disposed in the channel. The conditioning device may be configured to interact with the blade as the blade is drawn through the channel.

22 Claims, 4 Drawing Sheets

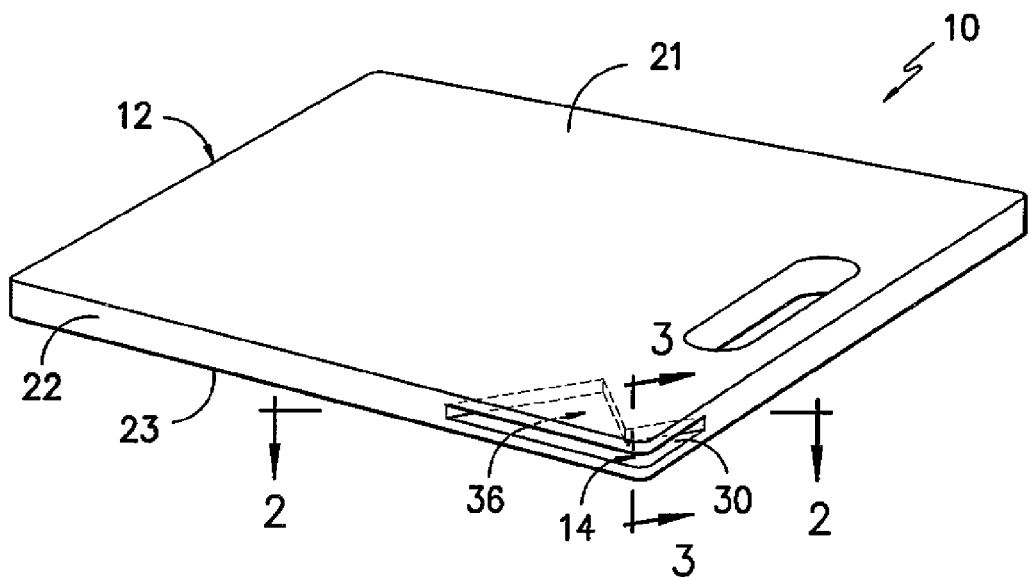
FIG. -1-
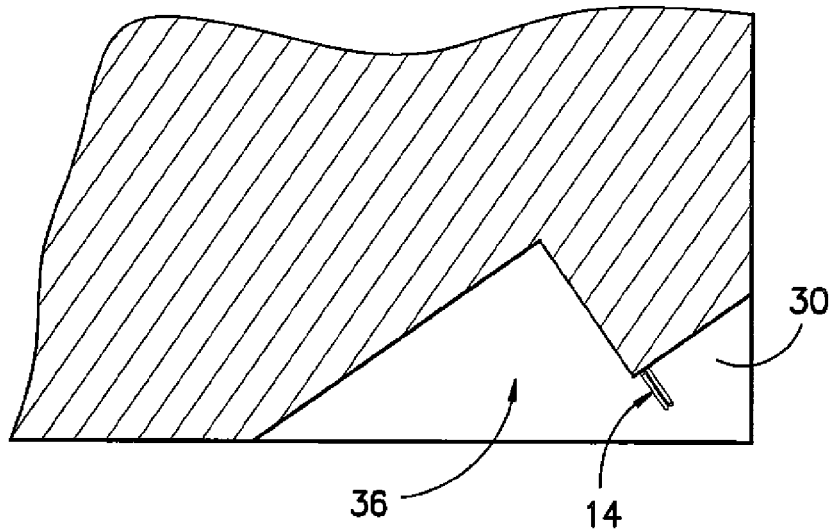
FIG. -2-

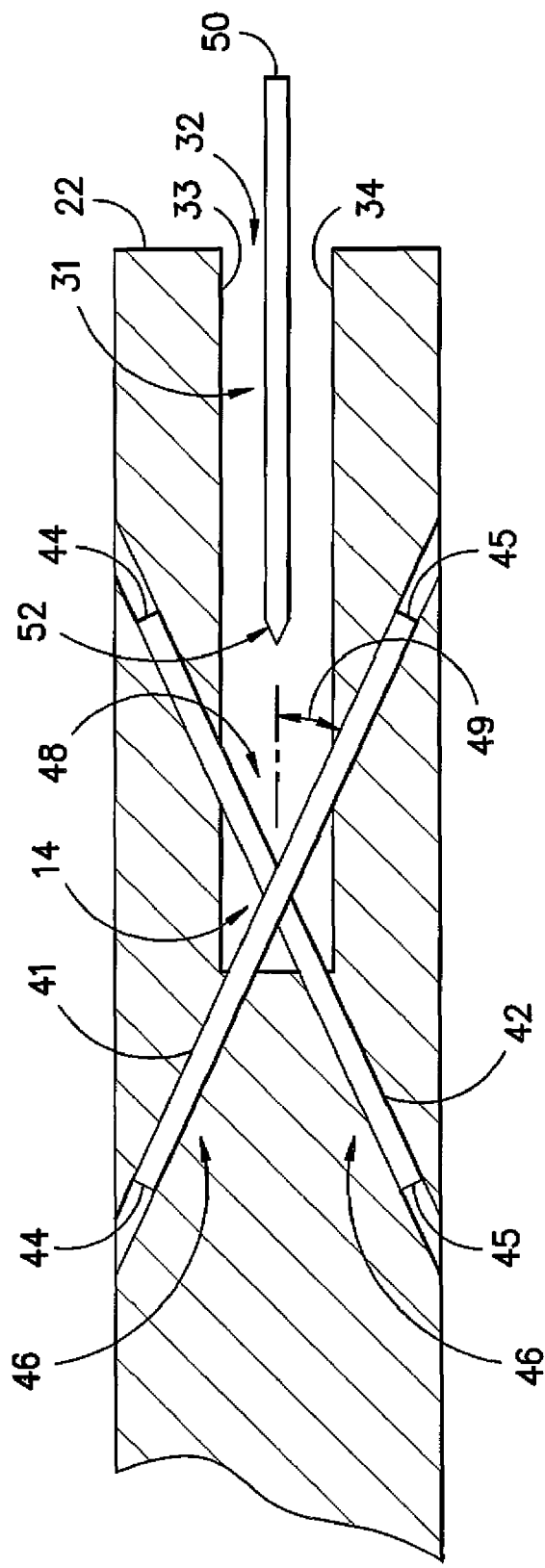
FIG. -3-

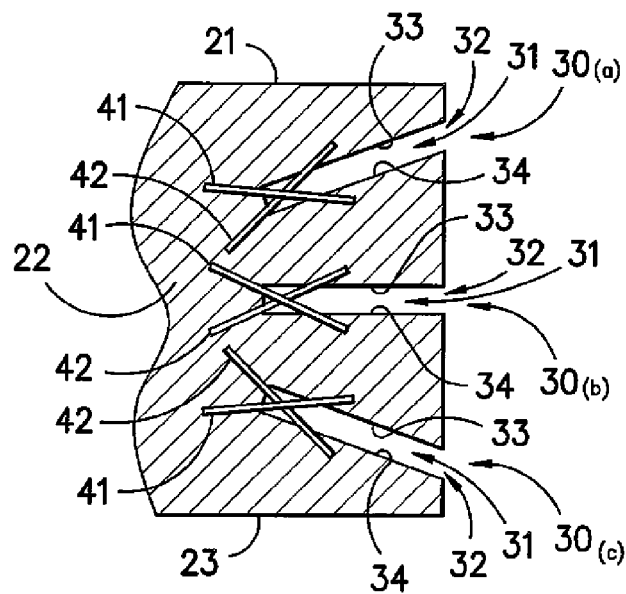
FIG. -4-
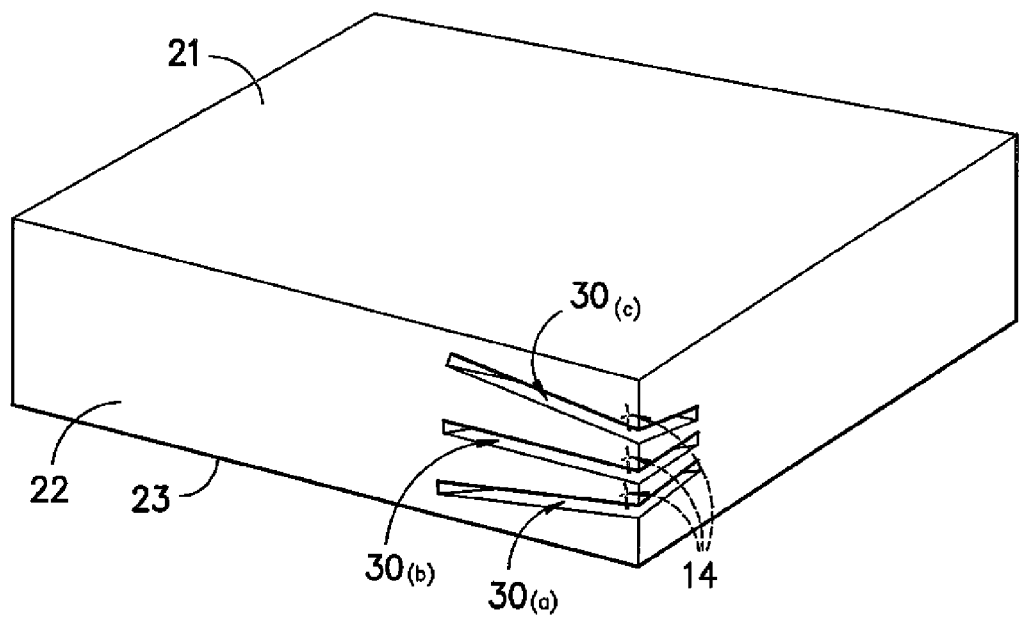
FIG. -5-

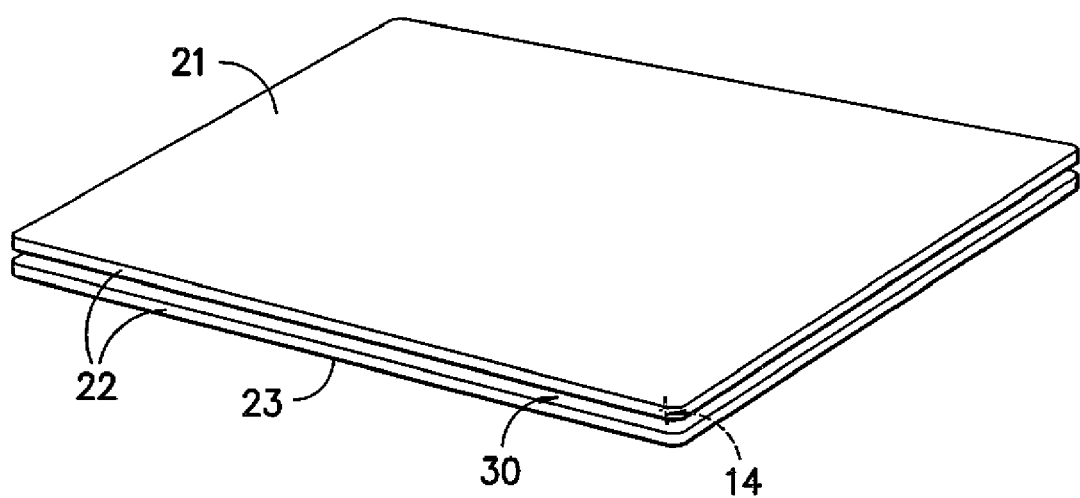
FIG. -6-

CONDITIONING AND CUTTING APPARATUS

TECHNICAL FIELD

The present disclosure relates to a conditioning apparatus for conditioning a blade, and more specifically to a cutting board with a conditioning device disposed therein.

BACKGROUND

A wide variety of cutting boards are utilized for various activities involving knives and other tools which incorporate blades. For example, cutting boards are frequently used in the kitchen or in the butcher's shop as surfaces on which to cut, slice, trim, and chop various foods. The cutting boards are frequently placed in prominent, exposed areas, such as, for example, in the kitchen on a countertop. Guests and customers who frequent the kitchen or butcher's shop may view the cutting boards in their exposed positions. It therefore may be desirable for cutting boards to be aesthetically pleasing.

In order to facilitate efficient and effective cutting by the blades of knives and other cutting tools, and to facilitate the safety of users of the blades, the blades should be maintained with sharp, straight cutting edges. Any cutting processes result in the cutting edges of the blades quickly becoming dull and warped, which necessitates periodic sharpening and conditioning of the blades. For example, blade cutting edges curl with frequent use, and conditioning of the blade to straighten the cutting edge is required to ensure safe, efficient, and effective use of the blade.

Many tools are available for sharpening and conditioning blades. These tools are generally independent sharpening and conditioning devices. The devices are generally stored between periodic uses and must therefore be located each time a blade is in need of sharpening or conditioning. The process of locating a sharpening device or a conditioning device can become tedious and time-consuming, and can take away from time spent, for example, preparing a meal.

In the past, cutting boards and blade sharpening and conditioning devices have been combined in order to allow for sharpening and conditioning of blades during use of the cutting board. However, these devices have been cumbersome to use, frequently requiring the user of the cutting board to remove food from the cutting board in order to utilize the sharpening device or conditioning device. Additionally, the sharpening and conditioning devices incorporated into cutting boards of the past have intruded on the cutting surfaces of the cutting boards, interfering with the cutting process and limiting the useful cutting surface of the cutting boards. Indeed, in some instances, the sharpening and conditioning devices incorporated into cutting boards of the past have accidently damaged and dulled blades during use of the blades on the cutting surfaces of the cutting boards. Further, the sharpening and conditioning devices incorporated into cutting boards of the past have interfered with the aesthetics and sanitary requirements of the cutting boards.

In view of the above, a need currently exists for a cutting board that incorporates a blade conditioning device. Additionally, a need exists for a cutting board that remains sanitary and aesthetically pleasing while incorporating a blade conditioning device. Further, a need exists for a cutting board that allows for the entire cutting surface of the cutting board to be utilized while incorporating an unobtrusive blade conditioning device.

SUMMARY

Aspects and advantages of the invention will be set forth in part in the following description, or may be obvious from the description, or may be learned through practice of the invention.

In one embodiment, a conditioning and cutting apparatus for a blade is provided. The apparatus may include a cutting board and a conditioning device. The cutting board may include a top cutting surface, a bottom surface disposed in opposition to the top cutting surface, and a peripheral wall extending between the top cutting surface and the bottom surface and defining the perimeter of the cutting board. The cutting board may define a channel therein. The channel may define a recess and an opening thereto. The peripheral wall may define the opening of the channel. The conditioning device may be disposed in the channel. The conditioning device may be configured to interact with the blade as the blade is drawn through the channel.

If desired, the channel may include a downstream section. The downstream section may be configured to hinder movement of the blade after the blade interacts with the conditioning device.

If desired, the conditioning device may include a plurality of rods. The plurality of rods may include a first rod and a second rod. The second rod may be adjacent to the first rod, and the first rod and the second rod may be oriented to define a blade conditioning zone between the first rod and the second rod. The blade conditioning zone may be defined by a blade conditioning angle between the first rod and the second rod.

The blade conditioning angle desirably may be in the range from about 15 degrees to about 45 degrees. For example, the blade conditioning angle desirably may be about 32.5 degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conditioning and cutting apparatus according to one embodiment of the present disclosure;

FIG. 2 is a cross-sectional view, along line 2-2 of FIG. 1, of a conditioning and cutting apparatus according to one embodiment of the present disclosure;

FIG. 3 is a cross-sectional view, along line 3-3 of FIG. 1, of a conditioning and cutting apparatus according to one embodiment of the present disclosure;

FIG. 4 is a cross-sectional view illustrating various embodiments of a channel and a conditioning device according to the present disclosure;

FIG. 5 is a perspective view illustrating various embodiments of a channel and a conditioning device according to the present disclosure; and FIG. 6 is a perspective view of a conditioning and cutting apparatus according to another embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a conditioning and cutting apparatus for a blade. The apparatus may be utilized to condition a blade, such as, for example, the blade of a knife or the blades of scissors. It should be understood, however, that the blade of the present disclosure is not limited to knives and scissors, but may be a razor, chisel, axe, hatchet, or any blade or cutting edge known in the art. Further, it should be understood that the blade of the present disclosure may be a straight-edged blade, serrated-edge blade, or a blade with any other edge design known in the art. The conditioning and cutting apparatus of the present disclosure may interact with the blade to condition the blade, such as, for example, by straightening or steeling the blade.

The conditioning and cutting apparatus may further be utilized as a cutting surface for the blade. For example, the conditioning and cutting apparatus may include a cutting board and a conditioning device. The conditioning device may be utilized to condition the blade, and the cutting board may provide a cutting surface for the blade. In accordance with the present disclosure, the conditioning and cutting apparatus of the present disclosure may beneficially provide an effective blade conditioning device while allowing complete access to the entire cutting surface of the cutting board. Further, the conditioning and cutting apparatus of the present disclosure may allow for an aesthetically pleasing cutting board which includes an effective blade conditioning device. Further, the conditioning and cutting apparatus of the present disclosure may allow for a blade conditioning device that cannot accidently damage or dull a blade during use of the blade on the cutting surface of the cutting board.

Referring to FIG. 1, one example of a conditioning and cutting apparatus 10 is illustrated. The apparatus 10 may include a cutting board 12 and a conditioning device 14. The cutting board 12 may include a top cutting surface 21, a bottom surface 23, and a peripheral wall 22. The bottom surface 23 may be disposed in opposition to the top cutting surface 21 and, desirably, the two surfaces 21 and 23 may extend in two substantially flat planes that are substantially parallel to one another, as shown in FIG. 1. If desired, the bottom surface 23 may be a bottom cutting surface. The peripheral wall 22 may extend between the top cutting surface 21 and the bottom surface 23. Further, the peripheral wall 22 may define the perimeter of the cutting board 12.

The cutting board 12 may be formed from any material known in the cutting board art. For example, in various embodiments, the cutting board 12 may be formed from wood, glass, or plastic. In one embodiment, the cutting board 12 may be a polypropylene cutting board 12. The cutting board 12 may further include any coating known in the cutting board art, such as, for example, an anti-bacterial coating.

The cutting board 12 may have any surface texture known in the art. For example, the top cutting surface 21, bottom surface 23, or peripheral wall 22 may have a smooth surface. Alternatively, the top cutting surface 21, bottom surface 23, or peripheral wall 22 may have a pebbled surface.

It should be further be understood that the cutting board 12 of the present disclosure is not limited to any shape or size cutting board. For example, in various embodiments, the peripheral wall 22 of the cutting board 12 may have a shape that is substantially circular or oval, substantially triangular, substantially rectangular, or any polygonal shape known in the art. Further, the cutting board 12 may be, for example, configured to form a butcher's block. It should further be understood that the cutting board 12 of the present disclosure is not limited to a stand-alone cutting board, but may be incorporated into, for example, countertops, tables, or any other kitchen or furniture product known in the art.

As shown in FIG. 1, the cutting board 12 may define a channel 30 therein. The channel 30 may define a recess 31 and an opening 32 thereto, as shown in FIG. 3. Further, the peripheral wall 22 may define the opening 32 of the channel 30. If desired, the opening 32 of the channel 30 may extend continuously along the entire perimeter of the cutting board 12. For example, the opening 32 of the channel 30 may extend continuously around the entire peripheral wall 22, as shown in FIG. 6. Alternatively, the opening 32 of the channel 30 may extend along only a portion of the perimeter of the cutting board 12. For example, the opening 32 of the channel 30 may extend along substantially less than the entire perimeter of the peripheral wall 22, as shown in FIGS. 1 and 5.

In one embodiment, for example, the cutting board 12 may be substantially rectangular-shaped and include four corners. In extending along only a portion of the perimeter of the cutting board 12, the opening 32 of the channel 30 may extend around one of the corners of the cutting board 12, as shown in FIGS. 1 and 5. In other embodiments, however, the opening 32 of the channel 30 may extend along any portion of the perimeter of the cutting board 12, such as for example, along one side of a rectangular-shaped cutting board 12 or along one portion of the perimeter of a circular cutting board 12.

If desired, the opening 32 of the channel 30 may extend in a direction substantially parallel to the top cutting surface 21, as shown in FIG. 1 and by channel 30(b) in FIG. 5. Alternately, the opening 32 of the channel 30 may extend in a direction that is angled to the top cutting surface 21, as shown by channels 30(a) and 30(c) in FIG. 5.

The recess 31 desirably may be defined by a pair of substantially parallel walls 33 and 34. If desired, the walls 33 and 34 could be oriented substantially parallel to the top cutting surface 21, as shown by channel 30(b) in FIG. 4. Alternately, the walls 33 and 34 may be oriented at an angle to the top cutting surface 21, as shown by channels 30(a) and 30(c) in FIG. 4. It should be understood that the recess 31 is not limited to a cross-sectional configuration that defines a pair of substantially parallel walls 33 and 34. For example, in one embodiment, a cross-section of the recess 31 may have a substantially rectangular shape, and the recess 31 may define a pair of substantially parallel walls 33 and 34, as shown in FIG. 4. Alternatively, a cross-section of the recess 31 may have a substantially circular or oval shape, or may have any polygonal shape known in the art, and the recess 31 may define a pair of walls 33 and 34 that are not substantially parallel.

The conditioning device 14 of the conditioning and cutting apparatus 10 may be disposed in the channel 30. The conditioning device 14 may be configured and disposed to interact with the blade 50 as the blade 50 is drawn through the channel 30. For example, in one embodiment, as shown FIG. 3, the conditioning device 14 may include a plurality of rods 41 and 42. Each of the rods 41 and 42 may include a first end 44, a second end 45, and a shaft 46. The rods 41 and 42 may extend across the channel 30. For example, in one embodiment, a portion of the shafts 46 may extend across the channel. Further, the first ends 44 and the second ends 45 of the rods 41 and 42 may be disposed embedded within the cutting board 12.

The rods 41 and 42 of the present disclosure may be made from any material known in the art for conditioning blades. For example, if desired, the rods 41 and 42 may be carbon steel rods. Alternatively, the rods 41 and 42 may be, for example, stainless steel rods, tool steel rods, solid carbide rods, or ceramic rods. The rods 41 and 42 may further include any coating known in the blade conditioning art. For example, if desired, the rods 41 and 42 may include a thermal diffusion coating applied thereon. A thermal diffusion process may be utilized to obtain the thermal diffusion coating, wherein a reaction between diffusion materials and carbon contained in the rods causes a layer or layers of carbide to be diffused onto the surface of the rods. Alternatively, the rods 41 and 42 may include, for example, a sand blast coating or a bead blast coating. A sand blast coating is applied using a process wherein sand or other similar materials are applied to the surface of the rods to remove surface deposits from the rods. A bead blast coating is applied using a process wherein beads of glass or other similar materials are applied to the surface of the rods to remove surface deposits from the rods.

The first ends 44 and the second ends 45 of the rods 41 and 42 may be embedded within the cutting board 12 according to any process known in the art. For example, in one embodiment, the cutting board 12 may be formed from wood, glass, or plastic. Passages may be drilled or bored into the cutting board 12, and the rods 41 and 42 may be inserted through the passages. For example, the rods 41 and 42 may be press-fit into the passages. An adhesive and/or an anti-bacterial substance can be applied to the passages and the rods 41 and 42 to seal the rods 41 and 42 in the passages. In another embodiment, the cutting board 12 may be formed from plastic. The rods 41 and 42 may be placed in a mold, and the cutting board 12 may be injection molded around the rods 41 and 42. In yet another embodiment, the cutting board 12 may be formed from plastic. The cutting board 12 may be injection molded around pins that form passages for the rods 41 and 42. The pins may then be drawn out of the cutting board, and the rods 41 and 42 may be press-fit into the passages in the cutting board 12. Further, for example, the rods 41 and 42 can be sealed into the passages using a thermal heat seal.

The plurality of rods 41 and 42 may include a first rod 41 and a second rod 42. If desired, the second rod 42 may be disposed in the channel 30 adjacent to the first rod 41. In one embodiment, the first rod 41 and the second rod 42 may be oriented to define a blade conditioning zone 48 between the first rod 41 and the second rod 42. The blade conditioning zone 48 may be defined by a blade conditioning angle 49, as shown in FIG. 3. The blade conditioning angle 49 may be any angle known in the art for conditioning a blade. For example, if desired, the blade conditioning angle 49 may be in the range from about 15 degrees to about 45 degrees. In one embodiment, the blade conditioning angle 49 may be about 32.5 degrees. In another embodiment, the blade conditioning angle 49 may be about 22 degrees. In yet another embodiment, the blade conditioning angle 49 may be about 16 degrees. The blade conditioning angle 49 and the blade conditioning zone 48 may be configured and disposed to interact with and condition a blade 50 as the blade 50 is drawn through the channel 30. For example, as the blade 50 is drawn through the channel, the cutting edge 52 of the blade 50 may contact the blade conditioning device 14 in the blade conditioning zone 48. The blade conditioning zone 48 may act to condition the blade 50 by straightening and steeling the cutting edge 52 of the blade 50.

If desired, the channel 30 may include a downstream section 36, as shown in FIGS. 1 and 2. The downstream section 36 may be configured to hinder movement of the blade 50 after the blade 50 interacts with the conditioning device 14. For example, the downstream section 36 may stop or slow the movement of the blade 50 after the blade has been drawn through the conditioning device 14. The downstream section 36 may act as a safety feature in the conditioning and cutting apparatus 10, to help prevent users of the apparatus 10 from cutting or injuring themselves when using the apparatus 10 to condition a blade.

In one embodiment, as shown in FIGS. 1 and 2, the downstream section 36 may be a substantially V-shaped slot portion of the channel, with the slot portion being defined by about a 90° angle therein. In other embodiments, however, the downstream section 36 may have a slot with any angle known in the art that may be effective to catch and stop or slow a blade 50 after the blade 50 is drawn through the conditioning device 14. In yet other embodiments, the downstream section 36 may be substantially U-shaped, or may be any other shape known in the art that may be effective to catch and stop or slow a blade 50 after the blade 50 is drawn through the conditioning device 14. Further, it should be understood that the downstream section 36 may be oriented with respect to the channel 30 at any orientation known in the art such that the downstream section 36 may be effective to catch and stop or slow a blade 50 after the blade 50 is drawn through the conditioning device 14.

It should be understood that the conditioning and cutting apparatus 10 of the present disclosure is not limited to a single channel 30 or a single conditioning device 14. For example, if desired, the conditioning and cutting apparatus 10 of the present disclosure may include a plurality of channels 30 and conditioning devices 14. The channels 30 may each have a recess 31 and an opening 32, and the recess 31 of each channel 30 may be defined by a pair of walls 33 and 34. The openings 32, recesses 31, and walls 33 and 34 of the channels 30 may extend and be oriented in various directions, as discussed above. It should be understood that the extension and orientation of each channel 30 may be different from the extension and orientation of any other channel 30. It should further be understood that each of the channels 30 may include a downstream section or sections 36, as discussed above.

Further, the conditioning and cutting apparatus 10 may include a plurality of conditioning devices 14 disposed in the channels 30. For example, if desired, a plurality of conditioning devices 14 may be disposed in any single channel 30. Alternatively, a conditioning device 14 or a plurality of conditioning devices 14 may be disposed in each of the plurality of channels 30.

For example, if desired, the conditioning and cutting apparatus 10 may include a plurality of first rods 41 and a plurality of second rods 42. Each of the first rods 41 and the second rods 42 may include a first end 44, a second end 45, and a shaft 46. The first rods 41 and the second rods 42 may each extend across a channel 30. For example, at least of portion of the shaft 46 of each of the first rods 41 and the second rods 42 may extend across a channel 30. A first end 44 and a second end 45 of each of the first rods 41 and the second rods 42 may be disposed within the cutting board 12. The second rods 42 may be disposed adjacent to the first rods 41. For example, if desired, each of the plurality of second rods 42 may be disposed adjacent to and paired with one of the plurality of first rods 41. The pairs of second rods 42 and first rods 41 may form a plurality of conditioning devices 14. Each of the conditioning devices 14 may define a blade conditioning zone 48 between the first rod 41 and the second rod 42 of the conditioning device 14. The blade conditioning zone 48 of each of the conditioning devices 40 may have a blade conditioning angle 49, as discussed above.

It should be understood that the blade conditioning angle 49 of each of the conditioning devices 14 need not be identical. For example, if desired, each of the blade conditioning zones 48 may have a different blade conditioning angle 49. The blade conditioning angles 49 may be in the range from about 15 degrees to about 45 degrees. Thus, the conditioning and cutting apparatus 10 of the present disclosure could be utilized to condition a wide variety of blades 50, each requiring a conditioning device 14 with a blade conditioning zone 48 at a different blade conditioning angle 49.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A conditioning and cutting apparatus for a blade, the apparatus comprising:
    a cutting board, the cutting board including a top cutting surface, a bottom surface disposed in opposition to the top cutting surface, and a peripheral wall extending between the top cutting surface and the bottom surface and defining the perimeter of the cutting board, the cutting board defining a channel therein, the channel defining a recess and an opening thereto, the peripheral wall defining the opening of the channel; and
    a conditioning device disposed in the channel, the conditioning device configured to interact with the blade as the blade is drawn through the channel,
    wherein the channel includes a downstream section, the downstream section configured to hinder movement of the blade after the blade interacts with the conditioning device.

2. The conditioning and cutting apparatus of claim 1, wherein the conditioning device comprises a plurality of rods, each of the rods including a first end, a second end, and a shaft, at least a portion of each of the shafts extending across the channel.

3. The conditioning and cutting apparatus of claim 2, wherein the first end of each of the rods and the second end of each of the rods are disposed within the cutting board.

4. The conditioning and cutting apparatus of claim 2, wherein the plurality of rods includes a first rod and a second rod, the second rod adjacent to the first rod, the first rod and the second rod oriented to define a blade conditioning zone between the first rod and the second rod, the blade conditioning zone being defined by a blade conditioning angle between the shaft of the first rod and the shaft of the second rod.

5. The conditioning and cutting apparatus of claim 4, wherein the blade conditioning angle is in the range from about 15 degrees to about 45 degrees.

6. The conditioning and cutting apparatus of claim 4, wherein the blade conditioning angle is about 32.5 degrees.

7. The conditioning and cutting apparatus of claim 2, wherein the rods are carbon steel rods.

8. The conditioning and cutting apparatus of claim 2, wherein the rods are stainless steel rods.

9. The conditioning and cutting apparatus of claim 2, wherein each of the rods includes a thermal diffusion coating applied thereon.

10. The conditioning and cutting apparatus of claim 1, wherein the opening of the channel extends continuously along the entire perimeter of the cutting board.

11. The conditioning and cutting apparatus of claim 1, wherein the opening of the channel extends along substantially less that the entire perimeter of the cutting board.

12. The conditioning and cutting apparatus of claim 1, wherein the recess defines a pair of substantially parallel walls.

13. The conditioning and cutting apparatus of claim 12, wherein the walls are oriented substantially parallel to the top cutting surface.

14. The conditioning and cutting apparatus of claim 12, wherein the walls are oriented at an angle to the top cutting surface.

15. The conditioning and cutting apparatus of claim 1, wherein the opening of the channel extends in a direction substantially parallel to the top cutting surface.

16. The conditioning and cutting apparatus of claim 1, wherein the opening of the channel extends in a direction that is angled to the top cutting surface.

17. A conditioning and cutting apparatus for a blade, the apparatus comprising:
    a cutting board, the cutting board including a top cutting surface, a bottom surface disposed in opposition to the top cutting surface, and a peripheral wall extending between the top cutting surface and the bottom surface and defining the perimeter of the cutting board, the cutting board defining at least one channel therein, the channel including at least one downstream section, the channel defining an opening thereto, the peripheral wall defining the opening of the at least one channel;
    at least one first rod having a first end and a second end disposed within the cutting board, the first rod extending across the channel; and
    at least one second rod having a first end and a second end disposed within the cutting board, the second rod extending across the channel and adjacent to the at least one first rod;
    wherein the at least one first rod and the at least one second rod are oriented to define a blade conditioning zone between the at least one first rod and the at least one second rod, the blade conditioning zone being defined by a blade conditioning angle and being configured and disposed to interact with the blade as the blade is drawn through the channel, and wherein the downstream section is configured and disposed to hinder movement of the blade after the blade interacts with the at least one first and second rods in the blade conditioning zone.

18. The conditioning and cutting apparatus of claim 17, wherein the blade conditioning angle is in the range from about 15 degrees to about 45 degrees.

19. The conditioning and cutting apparatus of claim 17, wherein the blade conditioning angle is about 32.5 degrees.

20. The conditioning and cutting apparatus of claim 17, further comprising a plurality of first rods and a plurality of second rods, wherein each of the plurality of second rods is adjacent to and paired with one of the plurality of first rods, each of the pairs of second rods and first rods forming a conditioning device, each of the conditioning devices defining a blade conditioning zone being defined by a blade conditioning angle.

21. The conditioning and cutting apparatus of claim 20, wherein each of the blade conditioning zones has a different blade conditioning angle, and wherein each of the blade conditioning angles is in the range from about 15 degrees to about 45 degrees.

22. The conditioning and cutting apparatus of claim 17, further comprising a plurality of channels, a plurality of first rods, and a plurality of second rods, and wherein at least one of the plurality of first rods and at least one of the plurality of second rods extends across each of the channels.

\* \* \* \* \*